(12) United States Patent
Komoto

(10) Patent No.: US 6,563,060 B2
(45) Date of Patent: May 13, 2003

(54) ELECTRONIC BALANCE

(75) Inventor: Akira Komoto, Shiga (JP)

(73) Assignee: Shimadzu Corporation, Kyoto (JP)

( * ) Notice: Subject to any disclaimer, the term of this patent is extended or adjusted under 35 U.S.C. 154(b) by 221 days.

(21) Appl. No.: 09/864,247

(22) Filed: May 25, 2001

(65) Prior Publication Data

US 2001/0047893 A1 Dec. 6, 2001

(30) Foreign Application Priority Data

May 31, 2000 (JP) ........................................ 2000-162458

(51) Int. Cl.⁷ .............................................. G01G 21/24
(52) U.S. Cl. .............................. 177/210 EM; 177/212; 177/229; 73/862.639
(58) Field of Search ................................ 177/211, 229, 177/210 EM, 212; 73/862.634, 862.639

(56) References Cited

U.S. PATENT DOCUMENTS

| | | | | |
|---|---|---|---|---|
| 4,453,609 A | * | 6/1984 | Griffen et al. ............... | 177/211 |
| 4,632,198 A | * | 12/1986 | Uchimura .................... | 177/211 |
| 4,653,600 A | | 3/1987 | Melcher et al. ............. | 177/229 |
| 4,657,097 A | * | 4/1987 | Griffen ....................... | 177/211 |
| 4,660,667 A | * | 4/1987 | Uchimura et al. .......... | 177/211 |
| 5,183,125 A | * | 2/1993 | Schurr ......................... | 177/211 |
| 5,190,117 A | * | 3/1993 | Freeman et al. ............ | 177/211 |
| 5,646,375 A | * | 7/1997 | Neuman ...................... | 177/229 |
| 5,736,685 A | * | 4/1998 | Nakajima .................... | 177/229 |
| 6,307,165 B1 | * | 10/2001 | Komoto ....................... | 177/229 |
| 6,326,562 B1 | * | 12/2001 | Burkhard et al. ........ | 177/210 EM |

FOREIGN PATENT DOCUMENTS

| | | |
|---|---|---|
| EP | 0080702 | 6/1983 |
| WO | WO 96/27780 | 9/1996 |

OTHER PUBLICATIONS

European Search Report dated Mar. 18, 2002.

* cited by examiner

*Primary Examiner*—Randy Gibson
(74) *Attorney, Agent, or Firm*—Rader Fishman & Grauer PLLC

(57) ABSTRACT

By using a second Roberval mechanism having beams orthogonal to beams of a first Roberval mechanism for supporting a weighing dish by a movable pillar and integrating a movable pillar of the second Roberval mechanism with a movable pillar of the first Roberval mechanism, longitudinal and crosswise one-sided loads are shouldered by first and second Roberval mechanisms and. Furthermore, by forming flexible portions flexible for one-sided loads (right and left one-sided loads) about the axis of the first Roberval mechanism on the first Roberval mechanism, torsions due to one-sided loads in the crosswise directions are prevented and influences of the torsions can be reduced. Moreover, by forming flexible portions flexible for a longitudinal one-sided load on the second Roberval mechanism, a torsion due to the longitudinal one-sided load is prevented and influences of the torsion can be reduced.

9 Claims, 3 Drawing Sheets

ELECTRONIC BALANCE

BACKGROUND OF THE INVENTION

1. Field of the Invention

The present invention relates to an electronic balance provided with a Roberval mechanism. The present invention can be applied to the so-called electronic balance provided with a balance mechanism and also to the so-called electronic scale provided with various load sensors without having a balance mechanism.

2. Description of the Prior Art

In the case of many electronic balances and electronic scales, a weighing dish for mounting a load to be measured is supported by a Roberval mechanism (also referred to as a parallel guide) in order to control the movement of the weighing dish. The Roberval mechanism has a structure in which a movable pillar is supported by an upper and a lower beams parallel with each other for a fixed pillar fixed to or integrated with the frame of a balance mechanism or scale mechanism. Both ends of each beam are respectively connected to the fixed pillar or movable pillar through an elastic fulcrum. A weighing dish is supported by the movable pillar. Then, a load working on the weighing dish is transmitted to an electrical load detecting section through a movable pillar or, moreover, through a lever. The electrical load detecting section includes a shift sensor and an electromagnetic-force generator feedback-controlled by using an output of the sensor as a detected value in the case of an electromagnetic-force-equalizing electronic balance. Further, the section includes a vibration chord and its exciting section in the case of a chord-vibrating scale.

As the above Roberval mechanism, the following Roberval mechanisms are known which have a structure obtained by assembling a fixed pillar, a movable pillar, and an upper and a lower beam as members independent of each other as disclosed in the official gazette of Japanese Unexamined Utility Model Publication No. Sho 63-35924 (1988) and moreover, an integral structure obtained by boring one flat base material as disclosed in the official gazette of Japanese Unexamined Patent Publication No. Sho 63-277936 (1988).

The above Roberval mechanisms respectively prevent a weighing dish from overturning or tilting and moreover, have a function for eliminating an error due to a one-sided load on the weighing dish, that is, a four-corner error (one-sided error).

The four-corner-error eliminating function of the Roberval mechanism is not effectuated before the parallelism of an upper and a lower beam is strictly adjusted. In other words, before elastic fulcrum portions provided for both ends of an upper and a lower beam are adjusted so that vertical intervals of the fulcrum portions coincide with each other. Generally, the accuracy of the parallelism ranges between 0.1 and 10 µm though it depends on an allowable four-corner error (balance accuracy). Therefore, it is difficult to meet the accuracy of parallelism in accordance with the machining accuracy of a part and adjustment while actually changing load mounting positions on a weighing dish after assembling, that is, the so-called four-corner-error adjustment is necessary.

The four-corner-error adjustment is performed by adjusting a one-sided error in the longitudinal direction of each beam of the Roberval mechanism, that is, the axial direction (hereafter referred to as longitudinal direction) and the direction orthogonal to the longitudinal direction (hereafter referred to as crosswise direction) while changing load mounting positions on a weighing dish. Therefore, in the case of a Roberval mechanism of an integral structure, portions corresponding to front, rear, right, and left are removed from a part of elastic fulcrum portions at both ends of an upper and a lower beam respectively or as disclosed in the official gazette of Japanese Unexamined Utility Model Publication No. Sho-35924 (1988), the adjustment mechanism of a corresponding portion is operated in the case of a Roberval mechanism provided with an adjustment mechanism for inching the position of a fixed portion to a fixed pillar of each elastic fulcrum portion.

Among the above Roberval mechanisms, the rigidity in the crosswise direction is lower than that in the longitudinal direction and thereby, a one-sided error easily occurs in the crosswise direction because the integral-structure Roberval mechanism obtained by boring a flat base material has a small crosswise-directional dimension. Therefore, the above integral-structure Roberval mechanism has a problem that it is difficult to correspond to a large weight or large dish.

On the other hand, an assembling-type Roberval mechanism has a problem that the adjustment result of a one-sided error in the longitudinal direction influences that of a one-sided error in the crosswise directions and vice versa and thus, adjustment of the errors is difficult.

The present inventor has proposed an electronic balance capable of solving the above problems and preventing a one-sided error from occurring in the crosswise direction even when using a Roberval mechanism having a small rigidity in the crosswise direction and simplifying the adjustment of a four-corner error of the mechanism compared to the conventional case (refer to the official gazette of Japanese Unexamined Patent Publication No. 2000-162026). In the case of the electronic balance, a second Roberval mechanism orthogonal to a Roberval mechanism (first Roberval mechanism) in which a weighing dish is supported by a movable pillar when viewed from above is used and the movable pillar of the second Roberval mechanism is integrated with that of the first Roberval mechanism. Then, an axial-directional (longitudinal-directional) one-sided load of the first Roberval mechanism is shouldered by the first Roberval mechanism and a one-sided load in the crosswise direction of the first Roberval mechanism (torsional direction about the axis of the first Roberval mechanism) is mainly shouldered by the second Roberval mechanism. Thereby, the adjustment operability is improved by separating the adjustment of a one-sided load in the crosswise direction from that in the longitudinal direction and simultaneously, weakness of the first Roberval mechanism in crosswise-directional rigidity can be covered.

Furthermore, it is preferable to provide a flexible portion soft in a tilted direction of the movable pillar of the first Roberval mechanism, in which a tilt is caused by a one-sided load in the axial direction of the first Roberval mechanism, in other words, a flexible portion for providing flexibility in the longitudinal direction of a beam of the first Roberval mechanism for the second Roberval mechanism. In this case, when a one-sided load in the axial direction of the first Roberval mechanism works and thereby, a force for tilting the movable pillar in the axial direction works, it is possible to absorb the force by the flexible portion and prevent the second Roberval mechanism substantially sharing the movable pillar from being influenced.

Moreover, in the case of the above proposed configuration, by housing the first Roberval mechanism in a square pipe so that the axial direction is parallel with the axis-center direction of the square pipe and setting the second Roberval mechanism to an end face of the square pipe, the positional relation between fixed pillars of two Roberval mechanism is not fluctuated due to a load to be measured and a compact and high-performance electronic balance having a high rigidity is obtained by utilizing the high torsional rigidity of the square pipe.

According to the above proposal of the present inventor, it is possible to substantially adjust one-sided errors independently in the longitudinal and crosswise directions to a weighing dish in the first and second Roberval mechanisms and realize a high-rigidity and compact electronic balance by combining these first and second Roberval mechanism with square pipes. However, according to further detailed examination by the present inventor, the following problems have been clarified.

In other words, when a one-sided load works in the crosswise direction, that is, when a torsional-directional force about the axis of the first Roberval mechanism works, a movable pillar is effective because the second Roberval mechanism is present and thereby, the pillar becomes rigid but the first Roberval mechanism is also slightly deflected. As a result, it is found that a one-sided error by the second Roberval mechanism interferes with a one-sided error by the first Roberval mechanism and this serves a factor for preventing complete one-sided-error adjustment.

SUMMARY OF THE INVENTION

The invention is made to solve the above problems, and its objective is to present an electronic balance eliminating above prevention factor and adjusting a one-sided error easily with high accuracy.

To achieve the above objective, an electronic balance of the present invention has a first Roberval mechanism in which a fixed pillar is supported by a movable pillar through an upper and a lower beams parallel with each other to support a weighing dish by the movable pillar and transmit a load working on the weighing dish to an electrical load detecting section through the movable pillar. Further, the electronic balance has a second Roberval mechanism provided with an upper and a lower beams almost orthogonal to the beams of the above first Roberval mechanism and parallel with each other. The movable pillar of the second Roberval mechanism is integrated with that of the first Roberval mechanism. Furthermore, the first Roberval mechanism is housed in a square pipe along its axial direction and the second Roberval mechanism is set to an end of the square pipe. In addition, a flexible portion weak in torsion about the axis of the first Roberval mechanism and rigid in axial-directional one-sided load is formed on the first Roberval mechanism and a flexible portion flexible in tilted direction of the first Roberval mechanism due to a one-sided load in the axial direction of the first Roberval mechanism is formed on the second Roberval mechanism.

The present invention eliminates the above prevention factor in order to more accurately adjust a one-sided error of an electronic balance according to the proposal of the present inventor. According to the proposal of the present inventor, a high-rigidity and compact mechanism is obtained which independently adjusts one-sided errors in the longitudinal and crosswise directions and utilizes the rigidity of a square pipe by using a second Roberval mechanism orthogonal when viewed from above in addition to a first Roberval mechanism and sharing a movable pillar by the both mechanisms. However, in the case of the present invention, a flexible portion weak in torsion about the axis of a first Roberval mechanism and rigid in axial-directional one-sided load is formed on the first Roberval mechanism. Thereby, when a one-sided load causing a torsional moment about the axis of the first Roberval mechanism, that is, a one-sided load in the crosswise direction works, the load is absorbed by the flexible portion formed on the first Roberval mechanism and thereby, the first Roberval mechanism is not deflected. Thus, it is possible to prevent the load from influencing the first Roberval mechanism.

Therefore, according to the present invention, it is possible to make the first and second Roberval mechanisms separately shoulder one-sided loads in the axial direction of the first Roberval mechanism and the direction orthogonal to the axial direction, that is, one-sided loads in the longitudinal and crosswise directions while the mechanisms are hardly influenced each other and easily adjust a one-sided error at a high accuracy by a high-rigidity and compact electronic balance.

DESCRIPTION OF THE PREFERRED EMBODIMENTS

The preferred embodiments of the present invention are described below with reference to the accompanying drawings.

Figure 1:
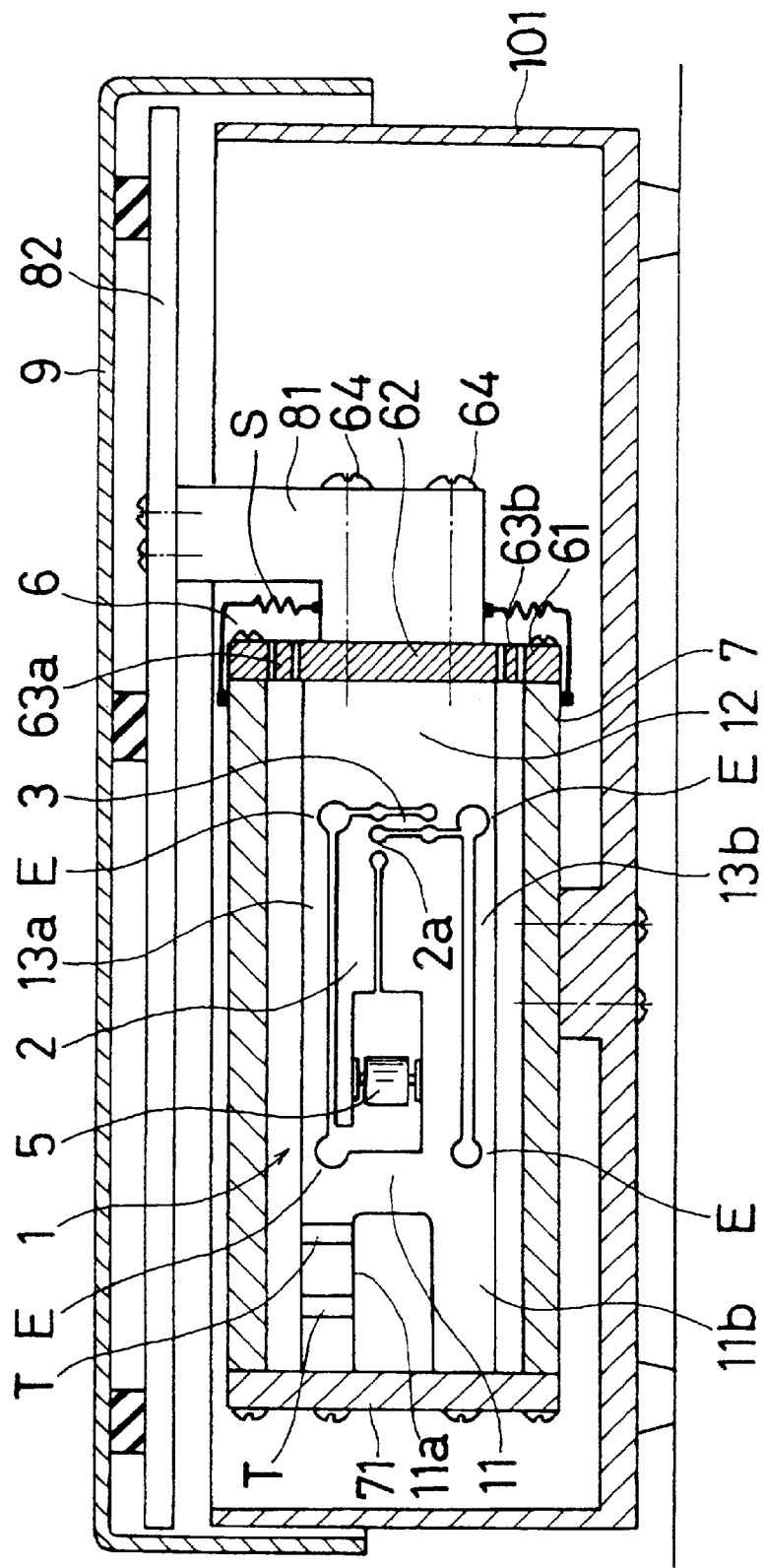
FIG. 1 is a sectional view of an embodiment of the present invention.
Figure 2:
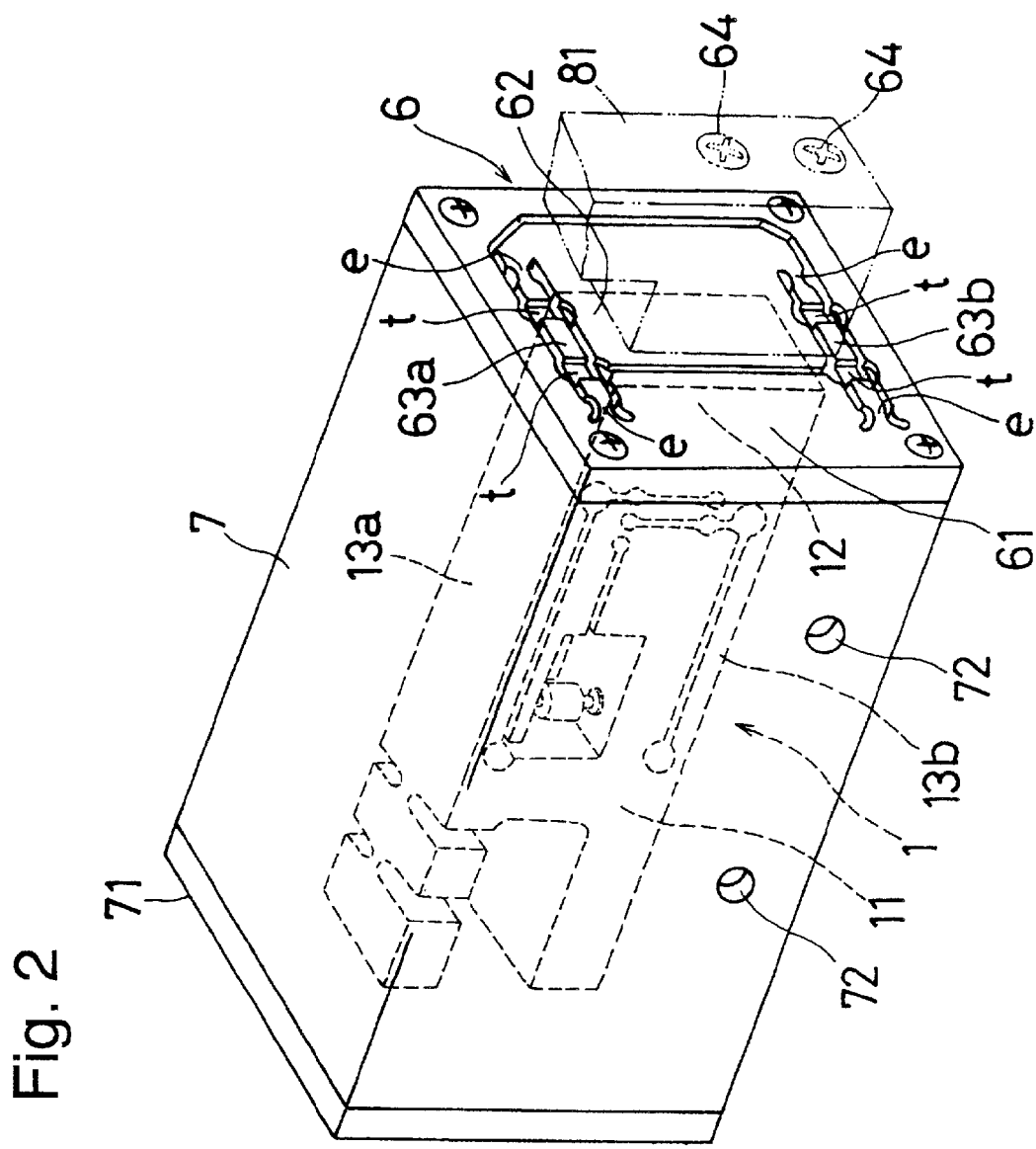
FIG. 2 is a perspective view showing a configuration of an essential portion of the weighing mechanism of the embodiment in FIG. 1.

FIG. 1 is a sectional view of an embodiment of the present invention and FIG. 2 is a perspective view of a configuration of an essential portion of the weighing mechanism of the embodiment in FIG. 1.

A first Roberval mechanism 1 is constituted of a fixed pillar 11, a movable pillar 12, and an upper and a lower horizontal beam 13a and 13b present between the pillars 11 and 12 and parallel with each other. Elastic fulcrums E are formed nearby the both ends of the beams 13a and 13b. The first Roberval mechanism 1 is obtained by forming a bore or a slit on a base material having a uniform cross section. Further, a lever 2, its fulcrum 2a, and a connecting member 3 for connecting the lever 2 with the movable pillar 12 are also integrally cut out from the base material from which the first Roberval mechanism 1 is cut out by boring or slitting the base material.

A turning-fork-type or chord-vibration-type load sensor 5 is set between the fixed pillar 11, and lever 2 of the first Roberval mechanism 1. A load working on the movable pillar 12 tilts the lever 2 through the connecting member 3. Then, the load is transmitted to the load sensor 5 due to the tilt of the lever 2 and an electrical signal proportional to the magnitude of the load is generated by the load sensor 5.

The first Roberval mechanism 1 is housed in a square pipe 7 so that axial directions (longitudinal directions) of the mechanism 1 and the pipe 7 become parallel with each other. An upper and a lower connecting arm 11a and 11b are integrally formed on the fixed pillar 11. Front ends of the connecting arms 11a and 11b are fixed to a lid 71 fastened to one end of the square pipe 7. Then, a second Roberval mechanism 6 is set to the other end of the square pipe 7. An inserting hole 72 for a file for shaving the elastic fulcrums E of the first Roberval mechanism 1 is formed at the side face of the square pipe 7 in order to adjust a one-sided error of the Roberval mechanism 1.

The second Roberval mechanism 6 is formed by forming a bore or slit on a flat base material similar to the case of the first Roberval mechanism 1. The second Roberval mechanism 6 is constituted of a fixed pillar 61, a movable pillar 62, and an upper and a lower horizontal beams 63a and 63b present between the pillars 61 and 62 and parallel with each other. Elastic fulcrums e are formed nearby the both ends of the beams 63a and 63b. Furhter, the fixed pillar 61 passes through further upper and lower outsides of the upper and lower beams 63a and 63b and extends toward the movable pillar 62 and moreover, front ends of the extended portions are connected each other to form a square as a whole. Furthermore, the squared fixed pillar 61 is secured to one end of the square pipe 7 by screws. While the pillar 61 is secured to the pipe 7, the beams 63a and 63b of the second Roberval mechanism 6 are orthogonal to beams 13a and 13b of the first Roberval mechanism 1. Under the above state, the movable pillar 62 of the second Roberval mechanism 6 is fixed to the movable pillar 12 of the first Roberval mechanism 1 by screws 64. Moreover, a dish setting member 81 is secured to the movable pillar 62 by the same screws 64. A flat dish receiver 82 is secured to the upper end of the dish setting member 81 and a weighing dish 9 is set to the upper face of the dish receiver 82.

The above unit mainly constituted of the first Roberval mechanism 1 housed in the square pipe 7 and the second Roberval mechanism 6 set to an end face of the square pipe 7 is housed in and fixed to a boxy scale case 101 whose upper face opens. The upper end of the dish-receiver setting member 81 secured to the movable pillar 62 of the second Roberval mechanism 6 projects from the upper opening portion of the scale case 101 and the flat dish receiver 82 and weighing dish 9 are located at the external upper side of the scale case 101 to cover the entire upper face of the scale case 101.

In the upper and lower connecting arms 11a and 11b formed integrally with the fixed pillar 11 of the first Roberval mechanism 1 and connected and fixed to the lid 71, two flexible portions T having a predetermined interval in the longitudinal direction are formed on the upper connecting arm 11a. Moreover, two flexible portions t having a predetermined interval in the longitudinal direction are formed on the upper and lower beams 63a and 63b of the second Roberval mechanism 6. The flexible portions T and t are respectively constituted by a thin-wall portion formed on each member.

According to the above embodiment, the tilting or operating direction of the weighing dish 9 set onto the dish receiver 82 is controlled by both the first Roberval mechanism 1 and second Roberval mechanism 6. Further, a four-corner error caused by a one-sided load working on the weighing dish 9 is eliminated by functions of the both first Roberval mechanism 1 and second Roberval mechanism 6.

That is, the first Roberval mechanism 1 comparatively easily makes it possible to adjust the parallelism in the longitudinal direction of the beams 13a and 13b because the span between the elastic fulcrums E of the beams 13a and 13b is long. Therefore, it is possible to easily eliminate an error due to a one-sided load in the longitudinal direction by adjusting the parallelism. However, it is difficult to eliminate an error due to a one-sided load in the direction orthogonal to the longitudinal direction, that is, in the crosswise direction orthogonal to the beams 13a and 13b because the dimension (thickness) in the crosswise direction is not large.

In the case of the second Roberval mechanism 6, it is difficult to eliminate an error due to a one-sided load in the longitudinal direction of the beams 13a and 13b of the first Roberval mechanism 1 because the dimension (thickness) in the longitudinal direction is not large. However, because the span between the elastic fulcrums e of the beams 63 and 63b is long in the direction orthogonal to the longitudinal direction, that is, the longitudinal direction of the beams 63a and 63b, it is possible to comparatively easily adjust the parallelism and easily eliminate an error due to a one-sided load in the crosswise direction. Therefore, by only applying adjustment of one-sided loads in the longitudinal direction of the beams 13a and 13b or 63a and 63b to the first Roberval mechanism 1 and second Roberval mechanism 6, the first and second mechanisms 1 and 6 respectively effectively function in accordance with the direction of a one-sided load to the weighing dish 9 and it is possible to eliminate errors to one-sided loads in all directions as a whole.

Moreover, because the flexible portions t are formed on the beams 63a and 63b of the second Roberval mechanism 6, the beams 63a and 63b are deflected at each flexible portion t when a one-sided load in the longitudinal direction works on the weighing dish 9 and thereby, the movable pillars 12 and 62 are about to tilt in the longitudinal direction, and thereby, no twist occurs between the Roberval mechanisms 1 and 6 and it is possible to prevent an unnecessary reaction of the second Roberval mechanism 6 and reduce one-sided errors.

Furthermore, because the flexible portions T are formed on the connecting arm 11a of the connecting arms 11a and 11b for connecting and fixing the fixed pillar 11 of the first Roberval mechanism 1 to the square pipe 7 through the lid 71, it is possible to reduce the influence of a one-sided load in the torsional direction of the square pipe 7, that is, a one-sided load in the crosswise direction on the first Roberval mechanism 1.

In other words, regarding the one-sided load in the crosswise direction, an error is prevented from occurring by supporting a torsional torque to the square pipe 7 by the second Roberval mechanism 6 as described above. However, it cannot be avoided that a slight deflection occurs in the torsional direction. The slight deflection influences the first Roberval mechanism 1 and causes one-sided errors to remain. However, because the flexible portions T are deflected when the one-sided load in the torsional direction works, it is possible to reduce the influence of the deflection of the flexible portions T on the first Roberval mechanism 1 and reduce the one-sided load.

In the case of the above embodiment, because the first and second Roberval mechanisms 1 and 6 are housed in the square pipe 7 having a high torsional rigidity, it is possible to obtain a precise weighing mechanism strong in a one-sided error though compact compared to the case of not using the square pipe 7. Furthermore, when sealing a weighing portion in order to protect it from dust or water, it is possible to seal the portion by setting a sealing member constituted of a rubber cover or the like to one end of the square pipe 7 as shown by S in FIG. 1. Thereby, advantages are also obtained that a force applied to the sealing member S by change in internal pressures due to expansion of air caused by change in atmospheric pressures or temperatures or change in pressures due to opening/closing of the door of a weighing chamber, becomes horizontal and thereby, it does not easily influence a measurement force and thus, fluctuation of measured values or zero point due to these disturbances can be greatly suppressed.

In the case of the above embodiment, the flexible portions T weak in torsion about the axis of the first Roberval mechanism 1 and rigid in axial-directional one-sided load are formed on the connecting arm 11a of two connecting arms 11a and 11b for connecting the fixed pillar 11 and lid 71 of the first Roberval mechanism 1. However, it is also permitted to form the flexible portions T on the other connecting arm 11b. Further, it is possible to form the flexible portions T on the upper and lower beams 13a and 13b or at a position closer to the fixed pillar 11 than to the working point of the load of the movable pillar 12. In short, it is possible to form the flexible portions T at an optional position as long as the torsional moment about the axis of the first Roberval mechanism 1 is absorbed through the movable pillar 12 and the influence of the moment does not reach the first Roberval mechanism.

Furthermore, in the case of the above embodiment, the first Roberval mechanism 1 and second Roberval mechanism 6 respectively use the integrated type obtained by forming a bore or a slit on a base material, but, the present invention is not restricted to the above case. It is possible to obtain the same function and advantage even by using the assembly type constituted by forming fixed and movable pillars and upper and lower beams for connecting the pillars each other by separate members.

Figure 3:
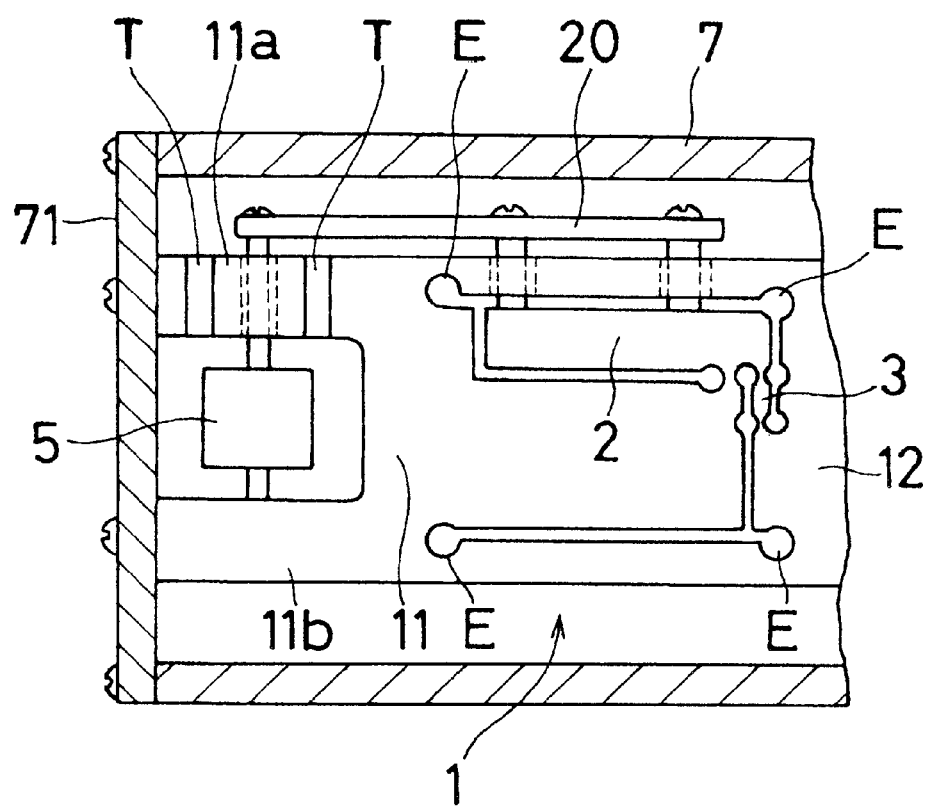
FIG. 3 is a sectional view showing a configuration of an essential portion of another embodiment of the present invention.

Furthermore, the present invention allows any modification as long as the modification does not deviate from the gist of the present invention. For example, the number of levers for connecting the movable pillar 12 of the first Roberval mechanism 1 and load sensor 5 is not restricted to one stage like the case of the above embodiment but it is possible to use a plurality of stages. Moreover, the position of the load sensor 5 is not restricted to the portion between the fixed pillar 11 and movable pillar 12 of the first Roberval mechanism 1 like the case of the above embodiment. For example, as shown by the sectional view of an essential portion in FIG. 3, a modification is permitted in which the load sensor 5 is set to a position closer to the lid 71 than to the fixed pillar 11 and a shift of the movable pillar 12 is transmitted to the load sensor 5 through not only the lever 2 but also an additional lever 20.

Furthermore, in the case of the above embodiment, an example is described in which the present invention is applied to the so-called electronic scale not having a balance mechanism, but, as described above, the present invention can also be applied to an electronic balance provided with a balance mechanism. For example, it is possible to actualize a compact, high-rigidity, and high-accuracy electromagnetic-force-balancing-type electronic balance having a small one-sided load by using an electromagnetic-force generator instead of the load sensor 5 in the above embodiment, a shift sensor for detecting a tilt of the lever 2, and a servo-mechanism for controlling an electromagnetic force generated by the electromagnetic-force generator to balance a mechanism in accordance with an output of the shift sensor.

What is claimed is:

1. An electronic balance comprising a first Roberval mechanism for supporting a fixed pillar by a movable pillar through an upper and a lower beam parallel with each other to support a weighing dish by the movable pillar and transmit a load working on the weighing dish to an electrical-load detecting section through the movable pillar, wherein a second Roberval mechanism is included which is provided with an upper and a lower beams extending in a direction almost orthogonal to the beams of the first Roberval mechanism and parallel with each other, and a movable pillar of the second Roberval mechanism is integrated with the movable pillar of the first Roberval mechanism, the first Roberval mechanism is housed in a square pipe along the axial direction of the square pipe and the second Roberval mechanism is set to an end of the square pipe, a flexible portion weak in torsion about the axis of the first Roberval mechanism and rigid in axial-directional one-sided load is formed on the first Roberval mechanism, and a flexible portion flexible in tilt direction of the first Roberval mechanism due to the axial-directional one-sided load of the first Roberval mechanism is formed on the second Roberval mechanism.

2. The electronic balance according to claim 1, wherein the first Roberval mechanism is actualized by forming a bore or a slit on a base material whose cross section is uniform.

3. The electronic balance according to claim 1, wherein the second Roberval mechanism is formed by forming a bore or a slit on a flat base material.

4. The electronic balance according to claim 1, wherein the second Roberval mechanism is constituted of a fixed pillar (61), the movable pillar, and the upper and lower horizontal beams present between the pillars and parallel with each other, and elastic fulcrums are formed nearby both ends of the beams.

5. The electronic balance according to claim 1, wherein the movable pillar of the second Roberval mechanism is integrated with the movable pillar of the first Roberval mechanism and a dish setting member is secured to the movable pillar of the second Roberval mechanism.

6. The electronic balance according to claim 1, wherein the flexible portion of the first Roberval mechanism is formed by a thin-wall portion on at least one of two connecting arms for connecting the fixed pillar of the first Roberval mechanism and a lid of the square pipe each other.

7. The electronic balance according to claim 6, wherein two flexible portions having a predetermined interval in the longitudinal direction are formed on the connecting arm with the flexible portion.

8. The electronic balance according to claim 1, wherein two flexible portions having a predetermined interval in the longitudinal direction are formed by a thin-wall portion on the upper and lower beams of the second Roberval mechanism.

9. The electronic balance according to claim 1, wherein the square pipe is sealed by setting a sealing member to one end of the square pipe.

* * * * *